United States Patent [19]

Willsey

[11] 3,854,394

[45] Dec. 17, 1974

[54] EGG LIQUID EXTRACTOR APPARATUS

[75] Inventor: Charles H. Willsey, Maple Hill, Kans.

[73] Assignee: Seymour Foods, Inc., Topeka, Kans.

[22] Filed: Jan. 4, 1973

[21] Appl. No.: 321,000

[52] U.S. Cl............. 99/495, 99/508, 99/574, 198/230
[51] Int. Cl. .................................................. A23n
[58] Field of Search ............ 99/495, 498, 508, 568, 99/574; 198/165, 230

[56] References Cited
UNITED STATES PATENTS

| | | | |
|---|---|---|---|
| 1,489,940 | 4/1924 | Hiller | 99/495 |
| 1,623,739 | 4/1927 | MacFarlane | 99/568 |
| 2,282,708 | 5/1942 | Dantzig | 99/495 |
| 2,393,724 | 1/1946 | Vickers | 198/230 |
| 2,898,961 | 8/1959 | Kauffman | 99/498 |
| 3,239,214 | 3/1966 | Rauschenberger | 198/165 |

*Primary Examiner*—Harvey C. Hornsby
*Attorney, Agent, or Firm*—Guy A. Greenawalt

[57] ABSTRACT

An apparatus for separating liquid from shell egg material which is discarded as inedible in egg cracking and separating or similar processing operations, which apparatus comprises a pair of driven belts of substantial width arranged one above the other with opposed upper and lower runs between which the egg material is fed so that shells are crushed and the liquid allowed to drain into a collecting pan beneath the lower belt while the shell fragments are discharged into a chute at the end of the belts. A feed chute is provided at the entrance to the belts for feeding the egg materials onto the upper run of the lower belt and a hopper is mounted along one side of the feed chute into which may be dumped quantities of material which is largely liquid so that a large portion of the liquid may pass through the perforated bottom wall of the hopper into a drain pan beneath the same while the remainder of the material is carried by a screw conveyor to the main feed chute.

17 Claims, 7 Drawing Figures

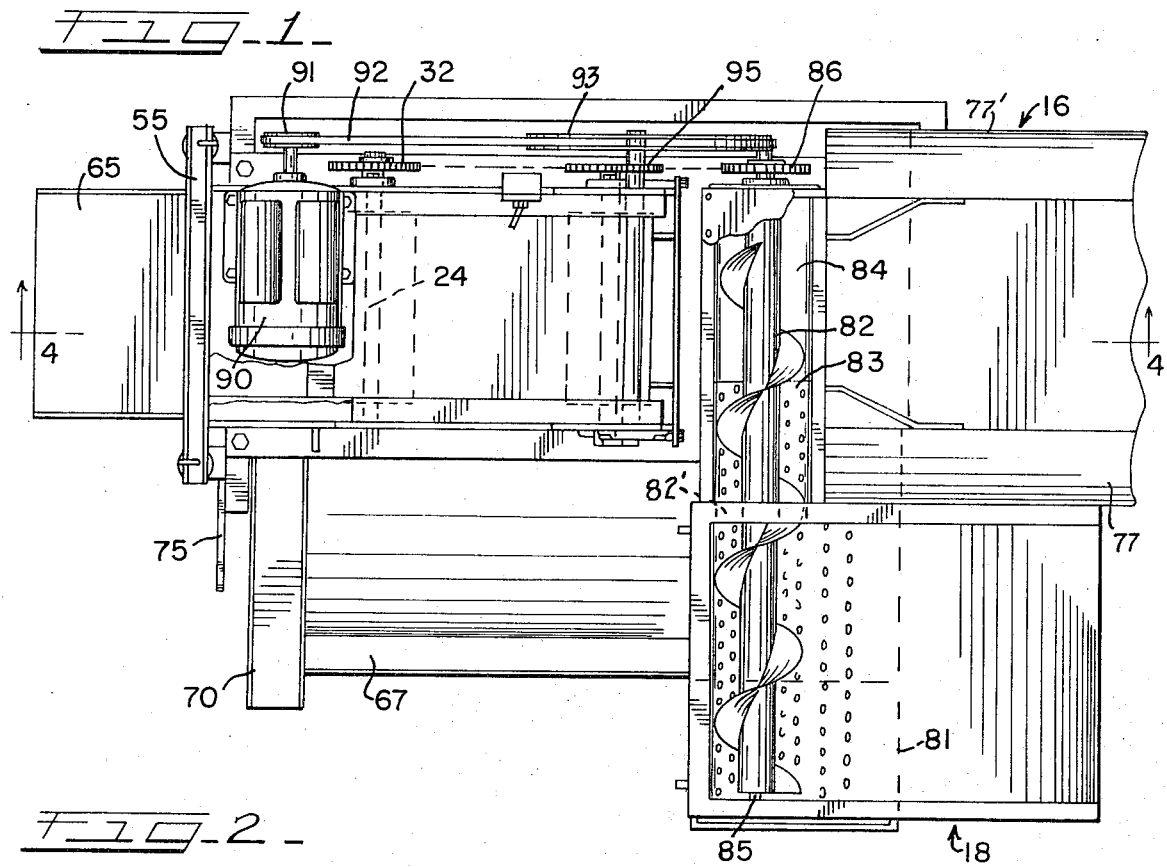

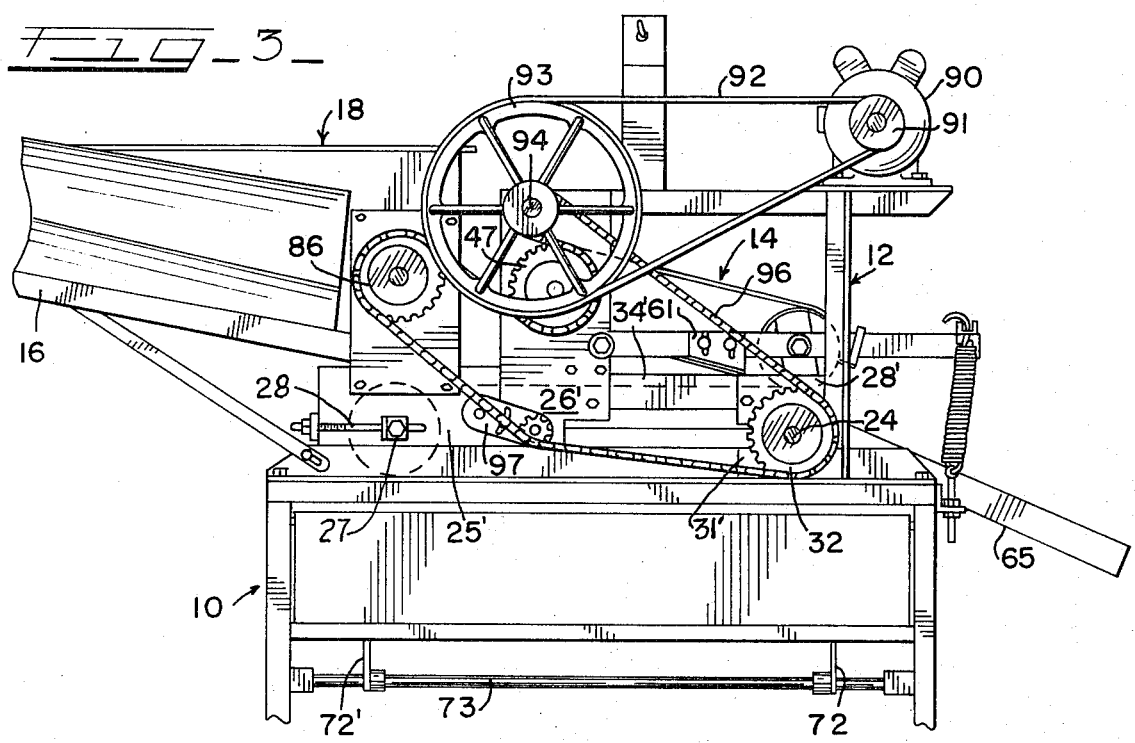
FIG_3_
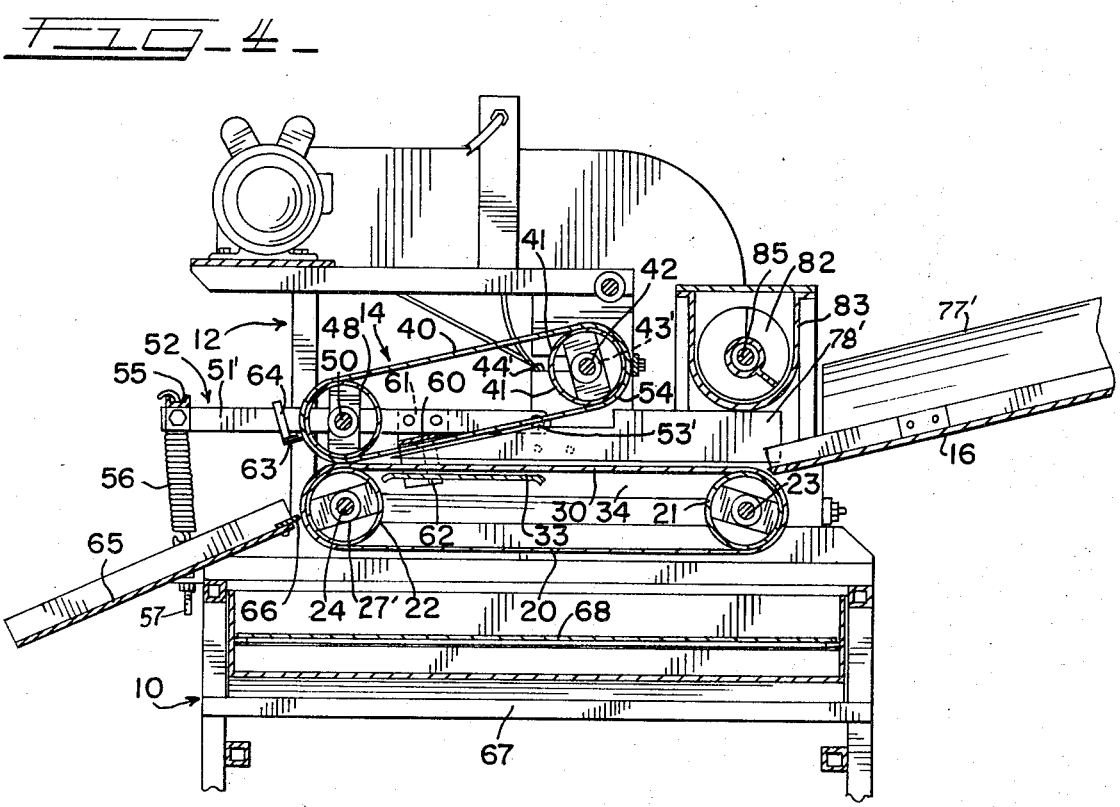
FIG_4_

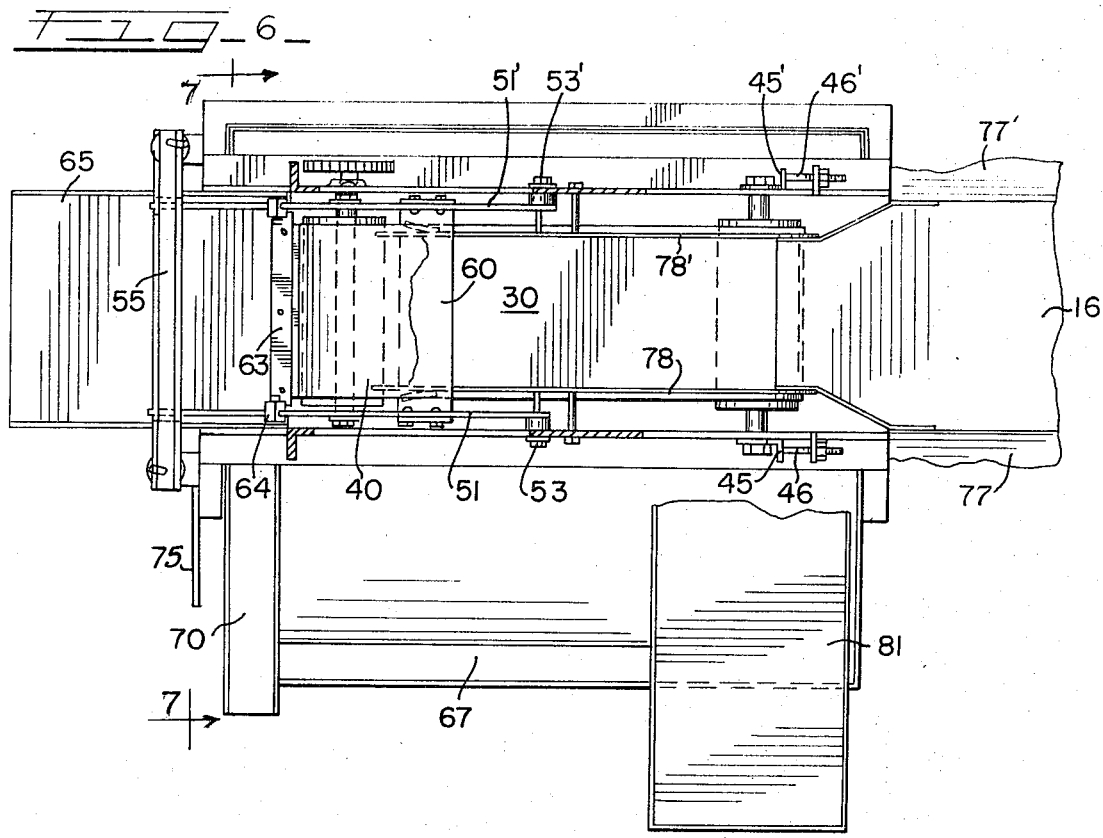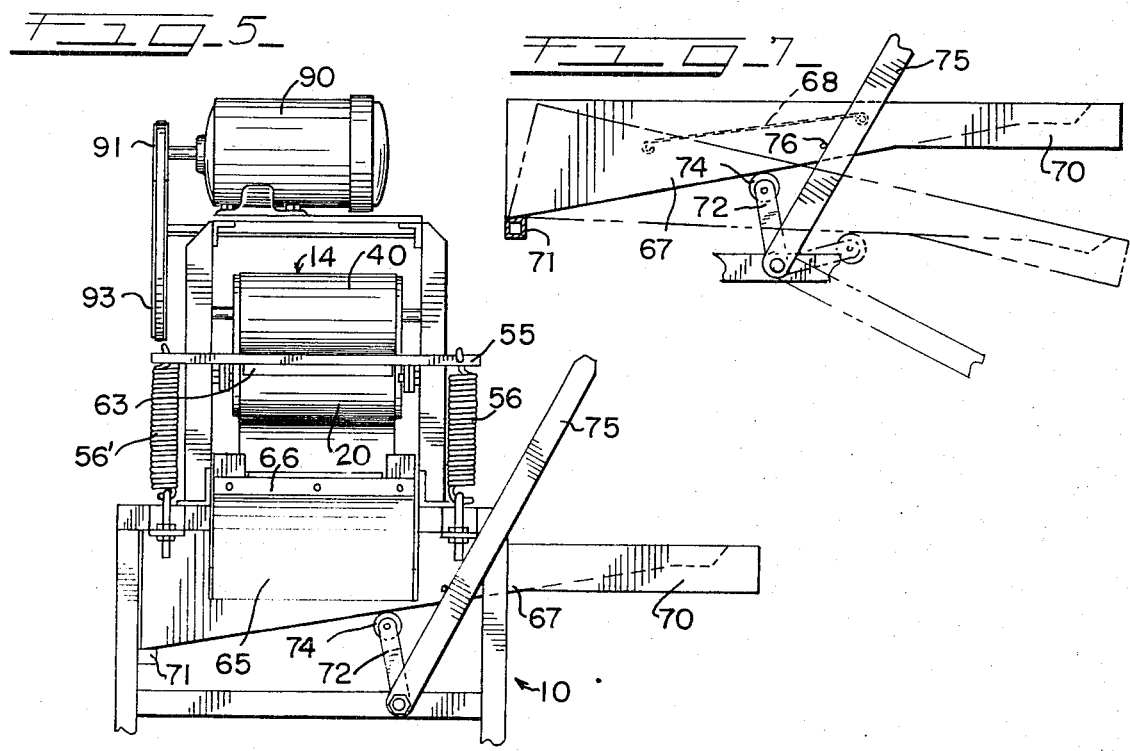

EGG LIQUID EXTRACTOR APPARATUS

This invention relates to egg processing and is more particularly concerned with improvements in an apparatus for extracting liquid from crushed shell egg materials.

In the operation of egg processing apparatus, for example, machines for cracking shell eggs and separating the albumen and yolks, a certain amount of material is accumulated which comprises a mixture of liquid and shell particles. This material which is considered inedible is separated from the products resulting from the breaking and separating operations of the machine. This material results from the removal from the machine of the egg contents when the yolk breaks before separation or when there are spots of blood in the egg contents or shell fragments which cannot be readily removed during the processing. While this material and sometimes whole eggs are treated as inedible, the liquid material, when salvaged, can be used for purposes other than human consumption, such as an ingredient in animal feed. However, it is necessary to separate out at least the larger portions of shell material so as to render the liquid fit for use. No satisfactory apparatus for this purpose has been developed heretofore and it is a general object of the present invention to provide a machine which will accept a mixture of egg liquid and shell fragments and extract the liquid material so that it is free of at least the major portion of the shell material.

It is a more specific object of the invention to provide an apparatus for processing shell egg material which will accept either whole eggs or a mixture of liquid and shells or shell particles and extract the liquid so that it is substantially free of the shell fragments enabling the liquid to be used for various purposes;

It is another object of the invention to provide an apparatus for crushing shell eggs or a mixture of egg liquid and shell material and for separating the major portion of the shell particles from the liquid so that the liquid may be salvaged and used, for example, as an ingredient in animal feed, or for other purposes.

A further object of the invention is to provide an apparatus for crushing shell eggs or mixture of egg liquid and shell material and to accomplish substantial separation of the liquid material from the shell fragments, enabling the liquid material to be recovered and used generally as products not designed for human consumption.

A still further object of the invention is to provide an apparatus for crushing eggs and egg materials and for separating the liquid from the major portion of the shells wherein the apparatus comprises a pair of relatively wide traveling belts arranged one above the other so as to pass the material between opposed runs of the belts which crush the shells and squeeze the material so that the liquid spills over the sides of the lower belt and is separated from the shells, the belt runs being spaced apart at the entrance end to receive the material and the spacing being reduced as the material approaches the discharge end so that the material is crushed and the liquid forced over the sides of the belts and into a collecting pan disposed beneath the same while the shell portions are carried to the ends of the belt runs where they are discharged.

These and other objects and advantages of the invention will be apparent from a consideration of the egg liquid extracting apparatus which is shown by way of illustration in the accompanying drawings wherein:

FIG. 1 is a plan view, with portions broken away, of an egg crushing and liquid extracting or separating machine which incorporates therein the principal features of the invention;

FIG. 2 is a side elevation, with portions broken away, of the machine shown in FIG. 1;

FIG. 3 is a side elevation, with portions broken away, showing the opposite side of the machine;

FIG. 4 is a longitudinal sectional view taken on the line 4—4 of FIG. 1;

FIG. 5 is an elevational view showing the discharge end of the machine;

FIG. 6 is a view taken on the line 6—6 of FIG. 2; and

FIG. 7 is a cross sectional view taken generally on the line 7—7 of FIG. 6, with portions broken away, illustrating the supporting arrangement for the fluid collecting pan.

Referring to the drawings, the machine comprises a base frame structure 10 on the top of which there is mounted a top frame structure 12 which supports a shell crushing apparatus 14 and an inclined infeed chute 16 having an open top for receiving the material to be processed, together with an associated hopper 18 into which quantities of the material may be dumped which is largely liquid so that some of the liquid may pass through apertures in the bottom of the hopper and into a drain pan beneath the hopper with the remainder being discharged into the main infeed chute. The bottom or base frame 10 supports a tiltable drain pan for collecting the separated liquid material.

The shell crushing apparatus 14 which also serves to separate the liquid material from the shell materials comprises a traveling lower or bottom belt 20 (FIGS. 4 and 5) which is mounted on horizontally spaced end pulleys or rollers 21 and 22 carried on parallel cross shafts 23 and 24. The cross shaft 23 at the trailing end is mounted in the bottom leg portions 25 and 25' (FIGS. 2 and 3) of L-shaped, laterally spaced side plates 26 and 26' which form portions of the top frame 12. The roller 21 serves as an idler roller and the support shaft 23 is mounted in the support plates 26 and 26' on horizontally slidable bearing members 27 and 27' having adjusting screws 28 and 28' for varying belt tension. The roller 22 at the leading end of the top run 30 of the belt 20 is carried on the shaft 24 which is journaled in a fixed position in vertically disposed, laterally spaced side plates 31 and 31', also forming part of the upper support frame 12. The shaft 24 carries at one end a sprocket 32 (FIG. 3) which is driven in a manner hereinafter described. The top run 30 of the bottom belt 20 is disposed in a horizontal plane and supported in an area adjacent the end roller 22 by a cross plate 33 extending between laterally spaced, vertically disposed side frame plates or bars 34 and 34', the latter extending below and serving as side guides or side splash guard plates for the top run 30 of the bottom belt member 20.

The top belt member 40 which has the same width as belt member 20 is carried at its trailing end on a support roller 41 (FIGS. 1 to 4) mounted on a cross shaft 42. The shaft 42 if journaled in end bearing members 43, 43' which are mounted for horizontal adjustment in slots 44, 44' in the side frame plates 26, 26'. The bearing members 43, 43' are adjusted in the slots 44, 44' by means of U-shaped brackets 45 which are connected to the bearing members and associated adjusting bolts 46 mounted in a fixed frame member at the rear or trailing end of the vertical frame plates 26, 26'. The belt member 40 is connected to a chain drive by means of a sprocket 47 which is mounted on the one end of the cross shaft 42. The belt member 40 is carried at the opposite or leading end of the apparatus 14 on an idler roller 48 which is mounted on a cross shaft 50. The shaft 50 is journaled in the side or leg members 51, 51' of a swingably mounted, U-shaped support frame 52. The frame side members 51, 51' are pivoted at 53, 53' on the side frame plates 26, 26' so that the frame 52 may swing or pivot to vary the space between the belt supporting rollers 22 and 48. The cross shaft for the belt supporting roller 41 at the trailing end of the belt member 40 is spaced well above the plane of operation of the top run 30 of the bottom belt member 20 so as to provide substantial space or clearance between the top run of the bottom belt member and the opposed bottom run 54 of the top belt member 40 for feeding the material to be processed between the two opposed belt runs. The outer end of the pivotally mounted frame 52 is normally held in a resiliently depressed position so that the infeed space or area between the two belt runs 30 and 54 normally decreases to a point where the belt members are substantially contacting each other. The support frame 52 has an end cross bar member 55 and depending tension springs 56 are connected at each end with eye bolts 57 at the bottom ends of the springs 56 which are connected for axial adjustment with mounting brackets 58 secured on the base support frame 10 so as to adjust the pressure between the belt runs at the discharge end of the crushing apparatus 14. The support frame 52 has mounted thereon a cross support or back-up plate 60 for the belt run 54 which is located adjacent the belt end support roller 48 generally opposite the support or back-up plate 33 for the top run 30 of the bottom belt member. The plate 60 is mounted on brackets 61 which also mount depending belt guide or aligning members 62 for holding the two belt members in vertical alignment. The frame 52 also carries a scraper blade 63 mounted on end brackets 64 for scraping from the belt member 40 any shell fragments which may cling to the belt surface as it moves up around the surface of the support roller 48.

A shell discharge chute or pan member 65 is mounted at the discharge end of the belt members 30 and 40 for receiving the shell fragments or shell particles which pass between the belt rollers 22 and 48. The shell receiving chute 65 is supported by suitable brackets at the top end of the base frame 10 and a scraper blade 66 is mounted on the upper edge for scraping from the bottom belt member 20 any shell fragments which cling to the surface as the belt passes down around the surface of support roller 22. The top of the base frame 10 is open beneath the bottom belt member 20 and a liquid collecting pan 67 is supported on the base frame 10 beneath the same.

The liquid collecting pan 67 is generally triangular in transverse section with a horizontal baffle plate 68 supported therein at the inner side and having a discharge channel 70 at the end adjacent the discharge end of the machine. The pan 67 is positioned with the innermost portion resting on a base frame member 71 and with the outermost portion supported on a pair of arm members 72, 72' which extend radially from a longitudinal shaft 73 and which have rollers 74, 74' on the free ends for traveling contact with the bottom of the pan. The shaft 73 is journaled in end frame cross members and has a handle forming lever arm 75 mounted on an extended end portion thereof which is upstanding at the one end of the machine and which may be swung to the right, as shown in FIGS. 5 and 7, to allow the pan 68 to tilt for discharge of the fluid through the side channel 70. The rollers 74 travel across a vertical center when the arm 75 is swung in either direction and a stop 76 is provided to limit the movement of the arm 75 in the direction to return the pan to horizontal collecting position.

At the infeed end of the machine the infeed chute 16 has upstanding side plates 77, 77' and this chute is mounted in downwardly inclined relation with the lower end reduced in width and positioned to discharge onto the top run 30 of the bottom belt member 20 between laterally spaced, vertically disposed side guard plates 78, 78'. The guard plates 78, 78' are mounted on side frame members and extend along the side margins of the bottom belt 20 between the opposed belt runs 30 and 54, as shown in FIGS. 4 and 6, so as to substantially confine the material to the area between the belt runs.

The hopper 18 is mounted on a cross frame 80 which extends at the entrance end of the machine and supports the hopper along the one side of the infeed chute 16. The bottom of the hopper 18 is perforated so as to allow liquid to drain into a collecting pan 81 which is supported beneath the hopper on the cross frame 80. A conveyor screw 82 is mounted in the bottom of the hopper 18 and extends at the chute side of the hopper through an opening 82' in the hopper side wall and along a trough or conduit-like housing 83 of U-shaped cross section with an opening 84 in the bottom so as to discharge the screw conveyed material onto the entrance end of the top run 30 of the bottom belt member 20. The screw conveyor shaft 85 is journaled in the oppositely disposed side or end wall plates of the hopper 18 and extension chute 83 and a drive sprocket 86 is mounted on the one end of the shaft 85.

A motor 90 (FIGS. 1 to 5) is mounted on the top portion of the upper frame structure 12, with a drive pulley 91 which is connected by belt 92 to a pulley 93 on a power shaft 94. The shaft 94 is journaled in the vertical frame plates 26 and 26' and carries sprocket 95 for driving chain 96, the latter being entrained about the sprockets 32, 86 and 47 so as to drive the same in the proper direction.

In the use of the illustrated machine, the crushing belt members 20 and 40 are driven so that the opposed runs 30 and 54 travel in the same direction and with the liquid collecting pans 67 and 81 in liquid collecting position the material to be processed may be fed onto belt run 30 by the infeed chute 16. Generally, this will be cracked or checked whole eggs or a mixture of partly whole and partly broken eggs including liquid. When the mixture is largely liquid, it may be dumped into the hopper 18 so that much of the liquid will drain off into the collecting pan 81 through the perforated bottom of the hopper 18. The solids will be fed by the screw conveyor 82 to the inner end of the infeed chute 16 and the entrance end of the top run 30 of the bottom crushing belt 20. Provision is made, of course, for emptying the pans 67 and 81 when needed and for collecting the shell material delivered to the discharge chute 65.

While designed especially for processing shell egg material, the apparatus may be used for processing any similar material capable of being handled in the same manner.

I claim:

1. An apparatus for crushing shell egg materials and separating the liquid from the shell particles which comprises an endless traveling belt of substantial width mounted on spaced end rollers with its upper run in a generally horizontal plane so as to support material deposited thereon, an upper endless traveling belt also of substantial width mounted on spaced end rollers with a lower run in substantial vertical alignment and traveling in a plane inclined toward the leading end of the upper run of the bottommost belt and in the direction of advance of the opposed upper and lower runs so that there is substantial entrance space between the trailing ends of said upper and lower belt runs which space decreases to an area of contact between said upper and lower belt runs in the direction of advance thereof, means for driving the belts so that said upper and lower runs advance in the same direction, a feed chute at the entrance to said opposed belt runs for depositing material onto the upper run of said bottommost belt, a drain pan for receiving liquid disposed beneath and extending beyond at least one side of said bottommost belt, and a discharge chute disposed at the end of said belt runs for receiving the shell particles discharged at the end of the upper run of the bottommost belt, said material fed onto the upper run of the bottommost belt being advanced between the contact of said upper and lower belt runs and the liquid portion of the material will be discharged over the sides of the upper run of said bottommost belt into said pan while shell portions will be crushed between said belt runs and carried into said discharge chute at the end of said upper run of said bottommost belt.

2. An apparatus for crushing shell egg materials and separating the liquid from the crushed shell particles which comprises an upright mounting frame a bottom belt of substantial width mounted on spaced support rollers on said mounting frame with its upper run in a generally horizontal plane, a top belt also of substantial width mounted on spaced support rollers on said mounting frame, said top belt support rollers being mounted above the upper run of the bottom belt so that the lower run of the top belt is in substantial vertical alignment and inclined in the direction of advance of the opposed upper and lower runs with substantial space between said belt runs at the entrance ends which space decreases to an area of substantial belt contact in the direction of advance, means for driving the belts so that said upper and lower runs advance in the same direction, a feed chute at the entrance to said opposed upper and lower belt runs for depositing materials on said lower belt run so that the materials will advance between the contact of said upper and lower belt runs and the material will be subject to crushing action between the belt runs with the liquid material discharging over the side edges of the upper run of said bottom belt and the shell portions being crushed and advanced thereon for discharge at the end thereof, a drain pan disposed beneath said bottom belt and extending beyond at least one side of said belt for receiving said liquid and a discharge chute disposed at the end of said bottom belt for receiving the shell particles discharged at the end of the upper run of said bottom belt.

3. An apparatus as set forth in claim 2 wherein said top belt has its trailing end mounted on a support roller on a cross shaft which is journaled in said mounting frame at a fixed elevation spaced above the upper run of said bottom belt and wherein said top belt has its leading end mounted on a support roller which is on a cross shaft carried on a movably mounted support frame enabling the leading end of said top belt to be moved toward and from the top run of said bottom belt so as to adjust the spacing and vary the crushing action of the belts.

4. An apparatus as set forth in claim 3 wherein said movably mounted belt support frame is resiliently urged in a direction to move the support roll which is carried thereon toward the upper run of said bottom belt.

5. An apparatus as set forth in claim 3 wherein said movably mounted support frame is pivoted at one end to a fixed frame member of said mounting frame and spring means is connected to said belt support frame and said mounting frame which is operative to resiliently urge the leading end of said top belt toward the top run of said bottom belt.

6. An apparatus as set forth in claim 2 wherein said top and bottom belts are mounted on support rollers at the leading ends thereof which are disposed one above the other in operative position and the opposed runs thereof have backing plate members adjacent said support rollers which are fixed relative to the paths of said opposed runs so as to apply crushing pressure to material advanced between said runs thereby to crush the shell portions of the material and force the liquid portions out over the side edges of the upper run of the bottom belt.

7. An apparatus as set forth in claim 2 wherein said mounting frame for said top belt support rollers is pivoted to swing on a fixed transverse axis spaced above the top run of said bottom belt and wherein a pair of tension springs are connected to said frame at the leading end of said belt runs which urge the frame in a direction to bring the leading ends of said runs into engagement.

8. An apparatus for crushing shell egg materials and separating the liquid from the crushed shell particles which comprises an upright support frame, an endless traveling bottom belt of substantial width mounted on spaced end rollers rotatably carried on said support frame with the upper run thereof traveling in a generally horizontal plane so as to support thereon the material to be crushed and separated with the liquid free to discharge over the side edges of said upper run, an endless traveling top belt, also of substantial width, mounted on spaced support rollers rotatably carried on said support frame, said top belt support rollers being mounted in oppositely disposed relation above the upper run of the bottom belt so that the lower run of the top belt travels in a plane which is aligned above and inclined relative to the horizontal plane of the upper run of the bottom belt and in the direction of advance thereof, with substantial space between said belt runs at the entrance ends which space decreases to an area of substantial belt contact in the direction of advance of said belt runs, said upper and lower belt runs advancing in the same direction to a crushing area where the upper and lower belt runs meet and crush the shells while forcing the liquid from between the belts and out over the sides of the upper run of the bottom belt, a feed chute at the entrance to said opposed upper and lower belt runs, a drain pan disposed beneath said bottom belt and extending beyond at least one of the sides of said belt for receiving liquid and a discharge chute disposed at the end of said bottom belt for receiving the crushed shell particles discharged at the end of said belt runs.

9. An apparatus as set forth in claim 8 wherein a scraper blade is mounted for engagement with the belt surface as it passes upwardly around the end support roller at the leading end of the top belt so as to remove shell particles adhering to said surface for deposit in said discharge chute.

10. An apparatus as set forth in claim 8 wherein a scraper blade is mounted for engagement with the belt surface as it passes around the end support roller at the leading end of the bottom belt for removing shell particles adhering to said surface for deposit in said discharge chute.

11. An apparatus as set forth in claim 8 and said drain pan being mounted beneath said bottom belt for tilting to an inclined position where liquid therein will flow out of the pan.

12. An apparatus for crushing shell egg materials and separating the liquid from the crushed shell particles which comprises an upright support frame, an endless traveling bottom belt of substantial width mounted on spaced end rollers rotatably carried on said support frame with the upper run thereof traveling in a generally horizontal plane so as to receive thereon the material to be crushed and separated, an endless traveling top belt, also of substantial width mounted on spaced support rollers rotatably carried on said support frame, said top belt support rollers being mounted in oppositely disposed relation above the upper run of the bottom belt so that the lower run of the top belt travels in a plane which is inclined relative to the horizontal plane of the upper run of the bottom belt and in the direction of advance thereof, with substantial space between said belt runs at the entrance ends which space decreases to an area of substantial belt contact in the direction of advance of said belt runs, said upper and lower belt runs advancing in the same direction to a crushing area where the upper and lower belt runs meet and crush the shells while forcing the liquid from between the belts and out over the sides of the bottom belt, a feed chute at the entrance to said opposed upper and lower belt runs, a drain pan disposed beneath said bottom belt for receiving liquid and a discharge chute disposed at the end of said bottom belt for receiving the shell particles discharged at the end of said belt runs, said drain pan having a discharge channel and being removably supported beneath said bottom belt along one side thereof on a pivot forming frame member and along an opposite side thereof on swingable arms which may be swung to a position to tilt the pan on said frame member so as to allow fluid therein to discharge through said channel.

13. An apparatus as set forth in claim 8 wherein an upwardly opening hopper is mounted at one side of the feed chute for receiving material to be crushed and a screw conveyor is mounted therein with a bottom opening disposed over said feed chute for transferring material from the hopper to the feed chute and wherein said hopper has a screen forming perforated bottom portion and a drain pan beneath said hopper for collecting liquid material draining through the perforated bottom portion.

14. An apparatus as set forth in claim 13 wherein said screw conveyor extends through a side wall of said hopper and into an upwardly opening trough which has a discharge aperture in the bottom thereof disposed above said feed chute.

15. An apparatus as set forth in claim 8 wherein the one top belt support roller at the leading end of said top belt is carried on a pivotally mounted frame with means for resiliently urging said frame in a direction to bring the opposed runs of said belt members at the leading ends thereof into engagement with each other.

16. An apparatus as set forth in claim 8 wherein said top belt has one support roller mounted on a generally rectangular frame which frame is pivotally mounted and resiliently urged in a direction to bring portions of the opposed runs of said top and bottom belt members into engagement.

17. An apparatus as set forth in claim 16 wherein said top belt roller mounting frame is pivoted at one end on the support frame and a tension spring is connected thereto so as to resiliently urge said mounting frame in a direction to bring portions of the opposed runs of said top and bottom belt members into engaging relation at the leading ends of said belts runs.

* * * * *